(12) United States Patent
Ohmi et al.

(10) Patent No.: US 6,616,562 B2
(45) Date of Patent: Sep. 9, 2003

(54) PLANETARY GEAR REDUCTION MECHANISM HAVING AN OILLESS BEARING

(75) Inventors: Masanori Ohmi, Anjo (JP); Akifumi Hosoya, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/963,364

(22) Filed: Sep. 27, 2001

(65) Prior Publication Data

US 2002/0049109 A1 Apr. 25, 2002

(30) Foreign Application Priority Data

Oct. 20, 2000 (JP) ........................................ 2000-320720

(51) Int. Cl.[7] .............................................. F16H 57/04
(52) U.S. Cl. ...................................... 475/159; 384/322
(58) Field of Search ................................ 475/159, 331; 384/279, 902, 291, 322, 372, 374, 385, 396

(56) References Cited

U.S. PATENT DOCUMENTS 4,093,323 A * 6/1978 Quandt et al. .............. 384/220
4,776,237 A    10/1988 Premiski et al.
5,743,139 A *  4/1998 Murata ........................ 74/7 E
6,102,675 A *  8/2000 Hsieh ....................... 417/423.13

FOREIGN PATENT DOCUMENTS

| JP | U-63-164621 | 10/1988 |
| JP | A-5-263737  | 10/1993 |
| JP | A-9-261906  | 10/1997 |

* cited by examiner

*Primary Examiner*—Charles A. Marmor
*Assistant Examiner*—Dennis Abdelnour
(74) *Attorney, Agent, or Firm*—Posz & Bethards, PLC

(57) ABSTRACT

In a planetary gear speed reduction mechanism includes a drive gear, a driven gear, a sun gear connected to the drive gear, an internal gear disposed around the sun gear, a planetary gear meshed with the sun gear and the internal gear, a bearing for supporting the planetary gear, a carrier pin for supporting the bearing and a planet carrier connected to the carrier pin for transmitting revolving motion of the planetary gear to the driven gear, the bearing has a cylindrical inner wall forming an annular grease reservoir around the carrier pin at opposite ends thereof. The bearing can be lubricated by the grease supplied from the simple grease reservoir for long time.

10 Claims, 3 Drawing Sheets

PLANETARY GEAR REDUCTION MECHANISM HAVING AN OILLESS BEARING

CROSS REFERENCE TO RELATED APPLICATION

The present application is based on and claims priority from Japanese Patent Application 2000-320720 filed Oct. 20, 2000, the contents of which are incorporated herein by reference.

BACKGROUND OF THE INVENTION

1. Field of the Invention

The present invention relates to a planetary gear speed reduction mechanism and, particularly, a bearing of a planetary gear mechanism.

2. Description of the Related Art

A planetary gear speed reduction mechanism used in an engine starter includes a planetary gear supported by a carrier pin via a bearing. The planetary gear is meshed with a sun gear and an internal gear so that the planetary gear can revolve around the sun gear. Accordingly, the bearing has to rotate at a high speed relative to the carrier pin under centrifugal force caused by revolution of the planetary gear. Therefore, it is necessary for the bearing to withstand heavy load and to have good lubricity.

For example, if an oilless bearing is used as the above bearing, a considerable portion of the oil contained in the oilless bearing may fly out under centrifugal force, and the bearing may not be lubricated. In order to hold such oil in the oilless bearing, JP-U-63-164621 proposes an oil-holding felt holder. However, this structure is rather complicated and necessitates additional work time to form an oil holding portion at a bearing case of the planetary gear.

SUMMARY OF THE INVENTION

A main object of the invention is to provide a simple and inexpensive bearing structure of the planetary gear speed reduction mechanism.

According to a main feature of the invention, such a bearing is a cylindrical sliding bearing that has a cylindrical inner wall forming an annular grease reservoir around a carrier pin at an end thereof. Preferably, the sliding bearing has grease reservoirs at opposite ends thereof.

The cylindrical inner wall prevents grease from flying away under centrifugal force. Further, the cylindrical inner wall may extend radially inward to hold grease more surely.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
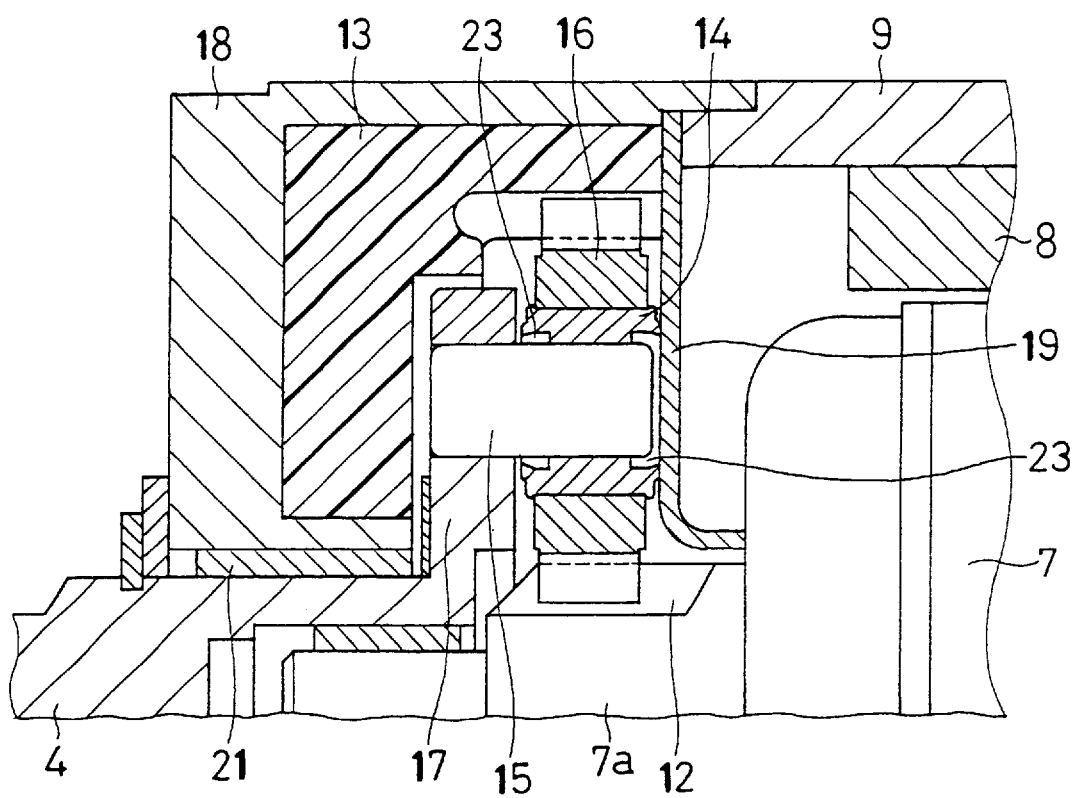
FIG. 1 is a schematic cross-sectional diagram illustrating a main portion of a planetary gear speed reduction mechanism according to a preferred embodiment of the invention.

A planetary gear speed reduction mechanism according to a preferred embodiment of the invention is described with reference to the appended drawings.

Starter 1 is comprised of a starter motor 2 and a magnet switch 3, a planetary gear speed reduction mechanism, which will be described in detail, a pinion shaft 4, a one-way clutch 5 and a pinion gear 6.

The starter motor 2 is comprised of an armature 7, a plurality of permanent magnet poles 8, a yoke 9, a pair of brushes 10, etc. When a key switch is turned on, the magnet switch 3 turns on, and the starter motor 2 is energized to rotate the armature 7.

The magnet switch 3 has a plunger for driving a lever 11 and the one-way clutch 5. The pinion shaft 4, one-way clutch 5 and the pinion gear 6 are well known and will not be described in detail.

As shown in FIG. 1, the planetary gear mechanism is comprised of a sun gear 12 that is formed on the outer periphery of the armature shaft 7a, an annular internal gear 13 formed at a portion around the sun gear 12, circumferentially aligned three planetary gears 16 and a planet carrier 17 that has three carrier pins 15. Each of the planetary gears 16 is supported by one of the carrier pins 15 via a bearing 14 and is meshed with the sun gear 12 and the internal gear 13. The internal gear 13 is fixedly held in a center housing 18 that is fixed to a front portion of the yoke 9. A buffer member may be disposed between the internal gear 13 and the center housing 18 to absorb an excessively large shock applied thereto during starting operation of the starter 1.

When the armature shaft 7a rotates, the sun gear 12 rotates to make the planetary gear 16 rotate on its axis and revolve around the sun gear 12. The revolution of the planetary gear 16 is transmitted to the pinion shaft 4 via the planet carrier 17.

There is a cover 19 between the planetary gear mechanism and the armature 7. The cover 19 has a thrusting surface for restricting the planetary gear 16 moving rearward or to the right in FIG. 1.

Figure 2:
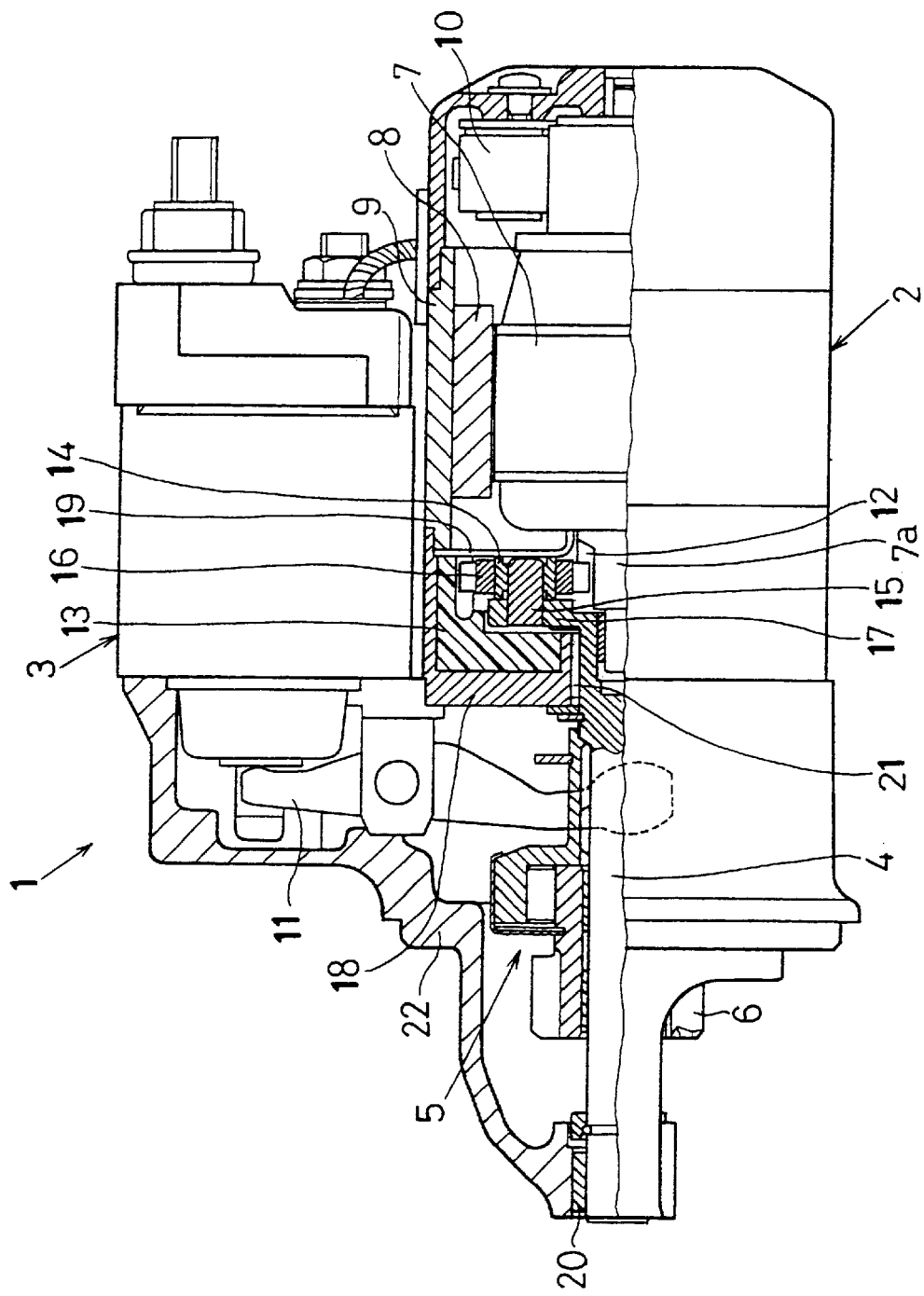
FIG. 2 is a side view of a starter for a vehicle in which the planetary gear speed reduction mechanism shown in FIG. 1 is installed.

As shown in FIG. 2, the pinion shaft 4 is rotatably supported by a front housing 22 and the center housing 18 via bearings 20 and 21 to be coaxial with the armature shaft 7a. The planet carrier 17 is integrated with the pinion shaft 4 at the rear end thereof. Each of the three carrier pins 15 is force-fitted to the planet carrier 17. The planet carrier 17 has a thrust-bearing surface for restricting the axial shift of the three planetary gears 16.

The one-way clutch 5 and the pinion shaft 4 are connected by a helical spline joint so that the one-way clutch is slidably fitted to the outer periphery of the pinion shaft 4. The one-way clutch 5 transmits the rotation of the pinion shaft 4 to the pinion gear 6 when the starter 1 is operated to crank an engine and interrupts the transmission of the rotation of the pinion gear to the pinion shaft 4 when the engine operates and the rotation speed of the pinion gear becomes higher than the rotation speed of the pinion shaft 4.

Figure 3A:
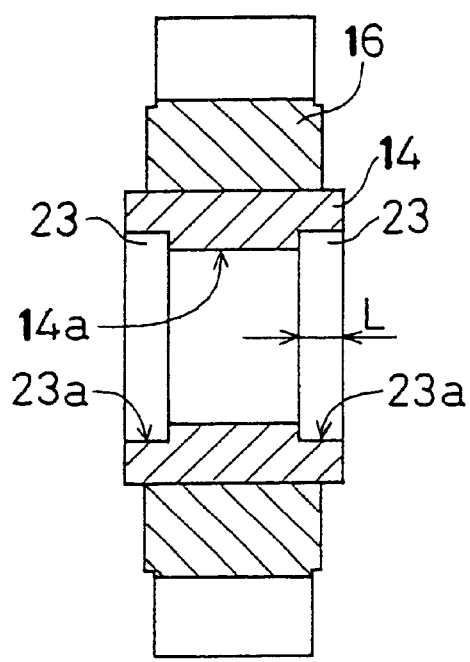
FIG. 3A is a cross-sectional side view of a planetary gear before it is assembled to a planetary gear speed reduction mechanism according to a preferred embodiment of the invention.

The bearing 14 is force-fitted to the inner periphery of each planetary gear 16. The bearing 14 is a sliding bearing made of sintered metal with oil impregnated therein. As shown in FIG. 3A, annular recesses 23 of depth L are formed at opposite axial ends of the bearing 14 to form grease reservoirs around the carrier pin 15. The depth L is larger than the the gap between the axial end of the carrier pin 15 and the cover 19 so that the whole inner periphery of the bearing 14 can slidably contact the outer periphery of the carrier pin 15 even if the bearing 14 shifts toward the cover 19.

Figure 3B:
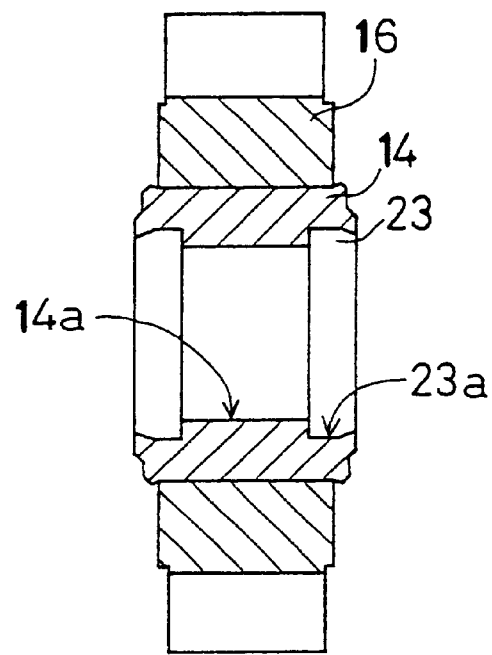
FIG. 3B is the planetary gear after it is assembled.

After the bearings 14 are force-fitted into the inner periphery of the planetary gears 16, the ends of the bearings 14 are deformed so that the ends of the bearing 14 expand radially, as shown in FIG. 3B. Accordingly, the bearing 14 is tightly secured to the planetary gear 16 and the inner surface 23a of the annular recess 23 curves inwardly to narrow the open end of the recess 23, which is filled with grease.

When a key switch is turned on, the magnet switch 3 turns on to energize the armature 7 to rotate. The rotation of the armature 7 is transmitted to the pinion shaft 4 via the speed reduction planetary gear mechanism and the pinion gear 6 via the pinion shaft 4 and the one-way clutch 5. On the other hand, pulling force of the magnet switch 3 is transmitted via the lever 11 to the one-way clutch 5 and the pinion gear 6, so that the pinion gear 6 can move forward (left in FIG. 2). Accordingly, the pinion gear 6 meshes the ring gear of an engine to crank the engine.

While the speed reduction planetary gear mechanism operates to reduce the rotation speed of the armature 7, lubrication grease is supplied from the annular recess 23 to the sliding contact areas between the carrier pin 15 and the bearing 14 and between the bearing 14 and the thrust-bearing surface of the cover 19. Since the recess 23 narrows at its open end, the grease is held stably.

When the engine starts and the key switch is turned off, the pulling force of the magnet switch 3 disappears. Consequently, the pinion gear 6 disengages from the ring gear and retracts therefrom along the pinion shaft 4. At the same time, the magnet switch 3 cuts the power supply to the armature 7 to stop operation of the starter 1.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A planetary gear speed reduction mechanism including a drive shaft, a driven shaft, a sun gear connected to said drive shaft, an internal gear disposed around said sun gear, a planetary gear meshed with said sun gear and said internal gear for revolving around said sun gear, a bearing for supporting said planetary gear, a carrier pin for supporting said bearing and a planet carrier connected to said carrier pin for transmitting revolving motion driven shaft, the sun gear, the internal gear, the planetary gear, the carrier pin, and the planet carrier, and a cover for closing said housing wherein:

said bearing comprises a cylindrical sliding bearing having a cylindrical inner wall forming a grease reservoir around said carrier pin at an end thereof;

said cover has a thrusting surface located adjacent to said grease reservoir, and the thrusting surface is supplied with grease from said reservoir, and the cover restricts axial motion of said planetary gear; and said cylindrical inner wall extends radially inward to hold grease.

2. The planetary gear speed reduction mechanism as claimed in claim 1, wherein said sliding bearing has another grease reservoir around said carrier pin at the other end thereof.

3. The planetary gear speed reduction mechanism as claimed in claim 1, wherein said drive shaft is connected to an armature shaft of an engine starter of a vehicle and said driven shaft is connected to a pinion shaft of said starter.

4. The planetary gear speed reduction mechanism as claimed in claim 1, wherein said grease reservoir is an annular groove.

5. A planetary gear speed reduction mechanism to be used in an engine starter including a motor having an armature shaft, said speed reduction mechanism comprising:

a pinion shaft and a pinion gear to be engaged with a ring gear of an engine;

a sun gear connected to said armature shaft;

an internal gear disposed around said sun gear;

a planetary gear meshed with said sun gear and said internal gear for revolving around said sun gear while rotating on its axis;

means for supporting said planetary gear; and a planet carrier, connected to said means, for transmitting revolving motion of said planetary gear to said driven shaft; wherein said means comprises a carrier pin fixed to said planet carrier and a cylindrical oilless bearing fixed to said planetary gear and slidably supported by said carrier pin, and wherein:

said oilless bearing has a cylindrical inner wall forming a grease reservoir around said carrier pin at an end thereof; and said oilless bearing has a deformed end that has been expanded in opposite radial directions to be tightly secured to said planetary gear and to narrow an open end of said grease reservoir.

6. The planetary gear speed reduction mechanism as claimed in claim 5, wherein said grease reservoir is an annular groove.

7. A planetary gear speed reduction mechanism including a drive shaft, a driven shaft, a sun gear connected to said drive shaft, an internal gear disposed around said sun gear, a planetary gear meshed with said sun gear and said internal gear for revolving around said sun gear, a bearing for supporting said planetary gear, a carrier pin for supporting said bearing and a planet carrier connected to said carrier pin for transmitting revolving motion of said planetary gear to said driven shaft, wherein:

said bearing comprises a cylindrical sliding bearing having a cylindrical inner wall forming a grease reservoir around said carrier pin at an end thereof; and said cylindrical inner wall extends radially inward to hold grease.

8. The planetary gear speed reduction mechanism as claimed in claim 7, wherein said sliding bearing has another grease reservoir around said carrier pin at the other end thereof.

9. The planetary gear speed reduction mechanism as claimed in claim 7, wherein said drive shaft is connected to an armature shaft of an engine starter of a vehicle and said driven shaft is connected to a pinion shaft of said starter.

10. The planetary gear speed reduction mechanism as claimed in claim 7, wherein said grease reservoir is an annular groove.

* * * * *